United States Patent

Park et al.

US009570207B2

(10) Patent No.: US 9,570,207 B2
(45) Date of Patent: Feb. 14, 2017

(54) ELECTRICAL CONTACT MATERIALS AND METHOD FOR PREPARING THE SAME

(71) Applicants: LSIS CO., LTD., Anyang-si, Gyeonggi-do (KR); Research & Business Foundation SUNGKYUNKWAN UNIVERSITY, Suwon-si, Gyeonggi-do (KR)

(72) Inventors: Ki Hun Park, Cheongju-si (KR); In Chan Song, Seoul (KR); Seung Hyun Baik, Seoul (KR); Dong Mok Lee, Suwon-si (KR); Jeong Hyeon Sim, Hwaseong-si (KR)

(73) Assignees: LSIS CO., LTD., Anyang-si (KR); Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 98 days.

(21) Appl. No.: 14/535,060

(22) Filed: Nov. 6, 2014

(65) Prior Publication Data
US 2015/0155066 A1 Jun. 4, 2015

(30) Foreign Application Priority Data
Nov. 29, 2013 (KR) .................. 10-2013-0148042

(51) Int. Cl.
*H01B 1/02* (2006.01)
*C22C 1/04* (2006.01)
*C22C 9/06* (2006.01)
*C04B 35/628* (2006.01)
*C22C 5/06* (2006.01)
*C22C 5/08* (2006.01)
*H01H 1/025* (2006.01)
*C22C 5/02* (2006.01)
*C22C 19/00* (2006.01)
(Continued)

(52) U.S. Cl.
CPC ............... *H01B 1/02* (2013.01); *C04B 35/01* (2013.01); *C04B 35/047* (2013.01); *C04B 35/0435* (2013.01); *C04B 35/62876* (2013.01); *C04B 35/62889* (2013.01); *C04B 35/62892* (2013.01); *C04B 35/66* (2013.01); *C22C 1/0425* (2013.01); *C22C 1/0433* (2013.01); *C22C 1/0466* (2013.01); *C22C 5/02* (2013.01); *C22C 5/06* (2013.01); *C22C 5/08* (2013.01); *C22C 9/06* (2013.01); *C22C 19/002* (2013.01); *C22C 19/03* (2013.01); *C22C 32/0021* (2013.01); *C22C 32/0084* (2013.01); *C22C 49/08* (2013.01); *C22C 49/14* (2013.01); *H01B 1/026* (2013.01); *H01B 1/04* (2013.01); *H01B 1/08* (2013.01); *H01H 1/021* (2013.01); *H01H 1/023* (2013.01); *H01H 1/025* (2013.01); *H01H 1/027* (2013.01); *B22F 2003/1051* (2013.01); *B22F 2201/20* (2013.01); *B22F 2202/01* (2013.01); *C04B 2235/3222* (2013.01); *C04B 2235/5472* (2013.01); *C04B 2235/656* (2013.01); *C04B 2235/77* (2013.01); *C04B 2235/96* (2013.01); *C04B 2235/9615* (2013.01)

(58) Field of Classification Search
CPC .............. H01B 1/02; H01B 1/04; H01B 1/08; H01B 1/026; H01H 1/027; H01H 1/021; H01H 1/023; H01H 1/0237; H01H 1/02374; H01H 1/025; H01H 1/029; C22C 49/08; C22C 49/14; C22C 32/0021; C22C 32/0026; C22C 32/0084; C22C 1/0425; C22C 1/0433; C22C 1/0466; C22C 5/02; C22C 5/06; C22C 5/08; C22C 9/06; C22C 19/002; C22C 19/03; C04B 35/62876; C04B 35/62889; C04B 35/62892
USPC .......................... 252/503, 513, 514; 200/266
See application file for complete search history.

(56) References Cited

U.S. PATENT DOCUMENTS 7,244,374 B2 *  7/2007  Anazawa .............. B82Y 30/00
                                              252/500
7,651,766 B2 *  1/2010  Chen .......................... B22F 7/08
                                              428/364
(Continued)

FOREIGN PATENT DOCUMENTS

CN    1540693    10/2004
CN    1624175     6/2005
(Continued)

OTHER PUBLICATIONS

English machine translation of Takayama (JP 2005-120427 A1), published May 12, 2005.*
(Continued)

*Primary Examiner* — Mark Kopec
*Assistant Examiner* — Matthew R Diaz
(74) *Attorney, Agent, or Firm* — Lee, Hong, Degerman, Kang & Waimey

(57) ABSTRACT

Disclosed are electrical contact materials and a method for preparing the same. The electrical contact material includes (i) one or more kinds of metals selected from the group consisting of silver (Ag), copper (Cu) and gold (Au), and an alloy of nickel (Ni); and (ii) carbon nano tubes (CNTs) coated with Ag nanoparticles, Ag plated CNTs, or Ag nanowires, or (i) one or more kinds of metals selected from the group consisting of Ag, Cu, Ni and Au; (ii) a metal oxide that is cadmium oxide, indium oxide, tin oxide, zinc oxide or mixture thereof; and (iii) CNTs coated with Ag nanoparticles, Ag plated CNTs, or Ag nanowires. Accordingly, it is possible to reduce the content of high-priced Ag and to obtain excellent electrical and mechanical properties.

2 Claims, 6 Drawing Sheets

(51) Int. Cl.
    *H01H 1/023* (2006.01)
    *C22C 19/03* (2006.01)
    *H01H 1/027* (2006.01)
    *H01H 1/021* (2006.01)
    *H01B 1/04* (2006.01)
    *H01B 1/08* (2006.01)
    *C22C 32/00* (2006.01)
    *C22C 49/08* (2006.01)
    *C22C 49/14* (2006.01)
    *C04B 35/01* (2006.01)
    *C04B 35/043* (2006.01)
    *C04B 35/047* (2006.01)
    *C04B 35/66* (2006.01)
    *B22F 3/105* (2006.01)

(56) References Cited

U.S. PATENT DOCUMENTS

| | | | | |
|---|---|---|---|---|
| 7,998,367 | B2* | 8/2011 | Khraishi | C09K 5/06 |
| | | | | 252/500 |
| 2009/0008712 | A1* | 1/2009 | Choi | B82Y 10/00 |
| | | | | 257/347 |
| 2009/0114425 | A1 | 5/2009 | Lee et al. | |
| 2009/0233086 | A1* | 9/2009 | Hirai | H01B 1/16 |
| | | | | 428/328 |
| 2010/0028633 | A1* | 2/2010 | O'Rourke | B82Y 10/00 |
| | | | | 428/210 |
| 2011/0318504 | A1* | 12/2011 | Han | C04B 35/62876 |
| | | | | 427/565 |
| 2013/0299212 | A1* | 11/2013 | Hata | B82Y 30/00 |
| | | | | 174/126.2 |

FOREIGN PATENT DOCUMENTS

| | | |
|---|---|---|
| CN | 1256450 | 5/2006 |
| CN | 101649401 | 2/2010 |
| CN | 102294485 | 12/2011 |
| CN | 102324335 | 1/2012 |
| EP | 2402285 | 1/2012 |
| JP | 58-141351 | 8/1983 |
| JP | 2005-120427 | 5/2005 |
| JP | 2007-169701 | 7/2007 |
| JP | 2009-030100 | 2/2009 |
| JP | 2009-117340 | 5/2009 |
| JP | 2012-006819 | 1/2012 |
| KR | 10-2008-0112318 | 12/2008 |
| KR | 10-2009-0047328 | 5/2009 |
| KR | 10-2011-0139588 | 12/2011 |

OTHER PUBLICATIONS

Feng, et al., "Electroless plating of carbon nanotubes with silver," Journal of Materials Science vol. 39, XP002454712, Jan. 2004, pp. 3241-3243.

European Patent Office Application Serial No. 14192982.8, Search Report dated Apr. 2, 2015, 9 pages.

Korean Intellectual Property Office Application Serial No. 10-2013-0148042, Office Action dated Oct. 28, 2014, 5 pages.

Korean Intellectual Property Office Application Serial No. 10-2013-0148042, Office Action dated Dec. 24, 2015, 4 pages.

Japan Patent Office Application Serial No. 2014-232326, Office Action dated Sep. 15, 2015, 2 pages.

The State Intellectual Property Office of the People's Republic of China Application No. 201410710471.1, Office Action dated Apr. 21, 2016, 8 pages.

\* cited by examiner

TEM Image of nAgCNTs

SEM Image of Ag plated CNTs

SEM Image of Ag nanowires

Conceptual View of Ag-Ni-nAgCNTs Composite

Conceptual View of Ag-Ni-Ag plated CNTs Composite

Conceptual View of Ag-Ni-Ag nanowires Composite

Conceptual View of Ag-CdO-Ag nanowires Composite

Conceptual View of Ag-Ni Composite

Conceptual View of Ag-CdO Composite

ELECTRICAL CONTACT MATERIALS AND METHOD FOR PREPARING THE SAME

CROSS-REFERENCE TO RELATED APPLICATIONS

Pursuant to 35 U.S.C. §119(a), this application claims the benefit of earlier filing date and right of priority to Korean Application No. 10-2013-0148042, filed on Nov. 29, 2013, the contents of which are all hereby incorporated by reference herein in its entirety.

BACKGROUND OF THE INVENTION

1. Field of the Invention

The present disclosure relates to electrical contact materials having excellent electrical and mechanical properties, and a method for preparing the same.

2. Description of the Conventional Art

Electrical contact materials are contact elements for electrical conduction, used at a portion contacted when an electric circuit is opened/closed in an electric device such as a circuit breaker or switch. The electrical contact materials are applied to motor switches, switch gears, MCBs, compact motors and lamps, automobiles, electric home appliances, and the like.

The electrical contact materials require physical properties of high melting point, excellent electrical conductivity and thermal conductivity, low contact resistance, excellent welding resistance, high hardness related to abrasion resistance, small deformation of a contact surface, and the like.

The electrical contact materials may be divided into contact materials for low current (1 A or less), contact materials for intermediate current (1 to 600 A), and contact materials for high current (600 A or more). Generally, materials having excellent electrical conductivity are used as the contact materials for low current. Materials having excellent electrical conductivity, high abrasion resistance, high melting point, and the like are used as the contact materials for intermediate current. Materials having high melting point are used as the contact materials for high current.

The electrical contact materials may also divided into tungsten based contact materials, silver-oxide based contact materials, and precious metal based contact materials. Contact materials generally used among these contact materials are silver-cadmium oxide (Ag—CdO) based contact materials.

Silver (Ag) has very excellent electrical conductivity and thermal conductivity, low contact resistance, and high corrosion resistance. Thus, the Ag is frequently used as a base material of electrical contacts. However, the Ag has weak abrasion resistance and impact resistance, and is expensive. Accordingly, when the Ag is used as an electrical contact material, the electrical contact material occupies about 30 to 60% of switch fabrication cost.

In order to solve this problem, an alloy of Ag and cadmium oxide (CdO) or an alloy of Ag and nickel (Ni) is used. Particularly, an Ag—CdO alloy is widely used. The Ag—CdO alloy has excellent welding resistance and attrition resistance and has relatively small temperature increasing rate in opening/closing of an electrical contact, and low contact resistance. Thus, the Ag—CdO alloy has stable thermal and electrical properties. Particularly, the Ag—CdO alloy is widely used as an electrical contact material. However, in Ag—CdO based contact materials, as oxidation progresses from the surface of the material to the interior of the material, oxide particles are coarsened, and an oxidation sparse layer is formed. Therefore, the hardness of the contact material is reduced, and the abrasion resistance of the contact material is decreased, thereby causing a trouble. CdO is a material having strong toxicity and has a problem of environmental pollution. The Ag increases the entire cost of the electrical contact material as the price of the Ag increases. Accordingly, it is possible to develop an electrical contact material capable of substituting for the Ag—CdO contact material.

Recently, an electrical contact material prepared by adding a carbon based compound to a metal has been proposed in order to improve abrasion resistance, electrical property and the like of the electrical contact material. For example, Chinese Patents Nos. 102324335, 001624175 and 001256450 have disclosed electrical contact materials including Ag powder and carbon nano tubes (CNTs). The electrical contact materials described in these documents include CNTs, thereby improving electrical characteristics of contact points. However, the electrical contact materials still have high contents of silver (Ag). Therefore, preparation cost is high, preparation processes are complicated, and the like.

SUMMARY OF THE INVENTION

Therefore, an aspect of the detailed description is to provide electrical contact materials which can be easily prepared at low cost while having electrical and mechanical properties, and a method for preparing the electrical contact materials, which has no problem of environmental pollution.

To achieve these and other advantages and in accordance with the purpose of this specification, as embodied and broadly described herein, an electrical contact material includes (i) one or more kinds of metals selected from the group consisting of silver (Ag), copper (Cu) and gold (Au), and an alloy of nickel (Ni); and (ii) carbon nano tubes (CNTs) coated with Ag nanoparticles, Ag plated CNTs, or Ag nanowires.

To achieve these and other advantages and in accordance with the purpose of this specification, as embodied and broadly described herein, an electrical contact material includes (i) one or more kinds of metals selected from the group consisting of Ag, Cu, Ni and Au; (ii) a metal oxide that is cadmium oxide, indium oxide, tin oxide, zinc oxide or mixture thereof; and (iii) CNTs coated with Ag nanoparticles, Ag plated CNTs, or Ag nanowires.

In one exemplary embodiment, the Ag and Ni may be used as the metals. The cadmium oxide may be used as the metal oxide In one exemplary embodiment, based on the entire weight of the alloy, the content of the metal may be 55 to 65 wt %, and the content of the Ni may be 35 to 45 wt %. Based on the entire weight of the alloy, the content of the nano-filler (CNTs coated with Ag nanoparticles, Ag plated CNTs or the Ag nanowires) may be 0.1 to 5 wt %.

In one exemplary embodiment, based on the entire weight of the metal and the metal oxide, the content of the metal may be 75 to 85 wt %, and the content of the metal oxide may be 15 to 25 wt %. Based on the entire weight of the metal and the metal oxide, the content of the nano-filler is 0.1 to 5 wt %.

In one exemplary embodiment, the surface of the carbon nano tube is coated with 3 to 5 nm of the particle size of the Ag nanoparticles, 20 to 300 nm of the thickness of the Ag plated CNTs. The Ag nanowires may have a diameter of 10 to 300 nm and a length of 10 to 70 μm.

In one exemplary embodiment, the particle size of the metal may be 1 to 10 μm.

To achieve these and other advantages and in accordance with the purpose of this specification, as embodied and broadly described herein, a method for preparing an electrical contact material, the method include: (a) preparing a powder mixture by mixing (i) one or more kinds of metals selected from the group consisting of Ag, Cu and Au, and CNTs coated with Ag nanoparticles, Ag plated CNTs, or Ag nanowires; (b) dispersing the powered mixture, using ultra sonication, and vacuum drying the dispersed powder mixture; and (c) sintering the vacuum-dried powder mixture.

To achieve these and other advantages and in accordance with the purpose of this specification, as embodied and broadly described herein, a method for preparing an electrical contact material, the method include: (a) preparing a powder mixture by mixing (i) one or more kinds of metals selected from the group consisting of Ag, Cu, Ni and Au, (ii) a metal oxide that is cadmium oxide, indium oxide, tin oxide, zinc oxide or mixture thereof, and (iii) CNTs coated with Ag nanoparticles, Ag plated CNTs, or Ag nanowires; (b) dispersing the powered mixture, using ultra sonication, and vacuum drying the dispersed powder mixture; and (c) sintering the vacuum-dried powder mixture.

In one exemplary embodiment, the sintering may be spark plasma sintering.

According to the electrical contact material of the present disclosure, the contents of high-priced precious metals are decreased, so that it is possible to reduce preparation cost and to improve price competitiveness. The nAgCNTs coated with the Ag nanoparticles, the Ag plated CNTs or the Ag nanowires are added to the electrical contact material of the present disclosure. The nAgCNTs, the Ag plated CNTs or the Ag nanowires act as electrical bridges, so that it is possible to obtain excellent electrical properties and to improve mechanical properties and abrasion resistance.

According to the method for preparing the electrical contact material of the present disclosure, a high-density sample can be conveniently prepared for a short period of time, and gaps between particles in the sample are minimized, thereby preparing the electrical contact material with excellent hardness and electrical conductivity of the sample.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF EXEMPLARY EMBODIMENTS

Figure 1A:
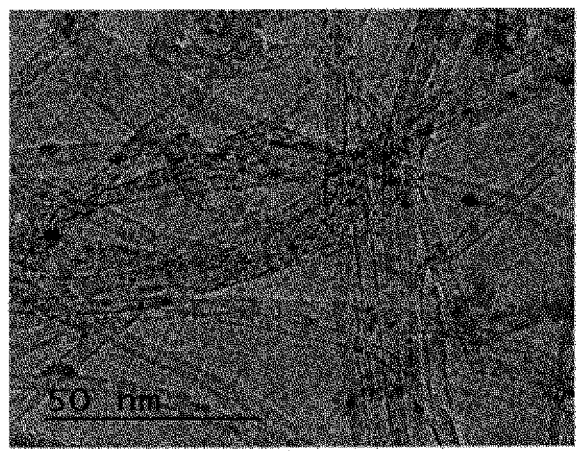
FIG. 1A is a transmission electron microscope (TEM) photograph of nAgCNTs prepared by coating surfaces of carbon nano tubes (CNTs) with silver (Ag) nanoparticles.

Description will now be given in detail of the exemplary embodiments, with reference to the accompanying drawings. For the sake of brief description with reference to the drawings, the same or equivalent components will be provided with the same reference numbers, and description thereof will not be repeated.

The present disclosure provides an electrical contact material including: (i) an alloy of nickel (Ni) and one or more metals selected from the group consisting of silver (Ag), copper (Cu) and gold (Au); and (ii) carbon nano tubes (CNTs) coated with Ag nanoparticles, Ag plated CNTs or Ag nanowires, or an electrical contact material including: (i) one or more kinds of metals selected from the group consisting of Ag, Cu, Ni and Au; (ii) a metal oxide that is cadmium oxide, indium oxide, tin oxide, zinc oxide or mixture thereof; and (iii) CNTs coated with Ag nanoparticles, Ag plated CNTs or Ag nanowires.

(1) Metal

The electrical contact material according to the present disclosure includes a metal. The metal have a conductivity and may be selected from the group consisting of Ag, Cu, Ni and Au. Two or more kinds of metals may be selected.

In an example of the present disclosure, the Ag and Ni are used as the metals. The Ag has very excellent electrical conductivity and thermal conductivity and excellent low contact resistance. Hence, the Ag is frequently used as a base material of electrical contacts. The Ag has excellent corrosion resistance, but has weak impact resistance and high price. The electrical conductivity and thermal conductivity of the Ni are lower than those of the Ag, but the mechanical strength of the Ni is higher than that of the Ag. Thus, a composite material containing the Ag and metal oxide or the Ag and Ni is frequently used as a contact material.

In another example of the present disclosure, the Cu may be used as the metal. The Cu has excellent electrical conductivity and thermal conductivity, and hence is frequently used for low voltage and low current. The Cu has contact resistance similar to that of the Ag in a state in which the surface of the Cu is clean. However, if the Cu is left in the air, an oxide film is formed on the surface of the Cu, and therefore, the Cu may have high contact resistance.

The Au may also be used as the metal. The Au has excellent electrical conductivity and thermal conductivity. However, like the Ag, the Au is high-priced.

The particle size of the metal is preferably 1 to 10 µm.

In case of an Ag—Ni based alloy, a Cu—Ni based alloy or an Au—Ni based alloy, the content of the Ag, Cu or Au is not particularly limited, but is preferably 55 to 65 wt %. When the content of the metal is less than 55 wt %, the electrical conductivity of the alloy is low, and therefore cannot be used as the electrical contact material. On the other hand, when the content of the metal exceeds 65 wt %, the abrasion resistance and attrition resistance of the alloy are deteriorated, and the preparation cost of the alloy remarkably increases. Accordingly, the content of the Ni is preferably 35 to 45 wt %.

In case of an Ag—CdO based alloy, a Cu—CdO based alloy, a Ni—CdO based alloy or an Au—CdO alloy, the content of the Ag, Cu, Ni or Au is not particularly limited, but is preferably 75 to 85 wt %. When the content of the metal is less than 75 wt %, the electrical conductivity of the alloy is low, and therefore cannot be used as the electrical contact material. On the other hand, when the content of the metal exceeds 85 wt %, the attrition resistance of the alloy is deteriorated, and the preparation cost of the alloy remarkably increases.

(2) Metal oxide

The electrical contact material according to the present disclosure includes a metal oxide. The metal oxide improves abrasion resistance. A material which is well sintered and has excellent mechanical properties is preferably used as the metal oxide. Cadmium oxide, indium oxide, tin oxide, zinc oxide or mixture thereof may be used as the metal oxide. In an example of the present disclosure, the cadmium oxide may be used as the metal oxide. The content of the metal oxide is not particularly limited, but is preferably 15 to 25 wt %, based on the entire weight of a metal-metal oxide. When the content of the metal oxide is less than 15 wt %, the welding resistance and attrition resistance of the electric contact material may be reduced. When the content of the metal oxide exceeds 25 wt %, the workability of the electrical contact material is deteriorated, and the contact resistance between oxide particles is increased. Therefore, the electrical contact material cannot be used as an electrical contact, and the lifespan of the contact may be lowered.

(3) Carbon Nano Tubes

The electrical contact material of the present disclosure may include carbon nano tube (CNTs). The CNT is a new material in which carbon atoms are connected to one another through $sp^2$ bonding to form a hexagonal honeycomb structure and have a tubular shape. The diameter of the CNT may be changed depending on the number of layers constituting the carbon wall of the CNT, but is approximately in the range of a few to a few tens nanometers (nm). The CNT has excellent electrical, mechanical and thermal properties, and thus can be used as a reinforcing material of a composite material. The CNT acts as an electrical bridge, thereby improving electrical and mechanical properties of the electrical contact material.

The content of the CNT is not particularly limited. However, when the CNT is used together with one or more kinds of metals selected from Ag, Cu and Au, and an alloy of Ni, the content of the CNT is preferably 0.1 to 5 wt %, based the entire weight of these metal and alloy. When the CNT is used together with one or more kinds of metals selected from Ag, Cu, Ni and Au, and a metal oxide that is cadmium oxide, indium oxide, tin oxide, zinc oxide or mixture thereof, the content of the CNT is preferably 0.1 to 5 wt %, based on the entire weight of the metal and metal oxide. When the content of the CNT is less than 0.1 wt %, the mechanical strength of the electrical contact material may be increased. However, an electrical network cannot be formed, and therefore, the electrical conductivity of the electrical contact material cannot be increased. On the other hand, when the content of the CNT exceeds 5 wt %, the electrical conductivity of the electrical contact material may be reduced due to a dispersion problem.

In spite of the advantages described above, the CNT has problems including coupling to metal, difficulty in dispersion, and the like.

In order to solve these problems, CNTs coated with Ag nanoparticles (nAgCNTs) or Ag plated CNTs may be used rather than the CNTs. The reason for coating the CNTs with Ag nanoparticles or plating the CNTs with Ag is to effectively form the electrical network. The CNT and metal are different kinds of materials, and it is generally difficult to bond the CNT and metal to each other. However, the Ag nanoparticles coated on the CNTs or the Ag plated on the CNTs enable bonding between the CNTs and Ag particles with a micro size, thereby forming the electrical network. In the composite, it is important that the CNTs are uniformly dispersed in a metal matrix.

In an example of the present disclosure, the surfaces of the CNTs may be coated with Ag nanoparticles (nAgCNTs) or be plated with Ag (Ag plated CNTs).

The particle size of the Ag nanoparticles is not particularly limited, but is preferably 3 to 5 nm. The thickness of the plated Ag is preferably 20 to 300 nm.

Figure 1B:
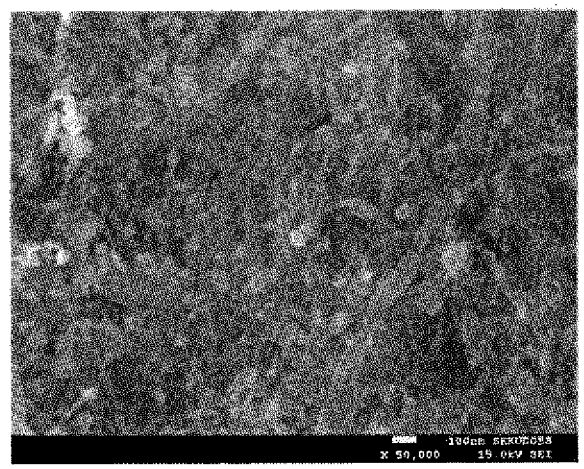
FIG. 1B is a scanning electron microscope (SEM) photograph of Ag plated CNTs prepared by plating Ag on surfaces of CNTs.

FIG. 1A illustrates a transmission electron microscope (TEM) photograph of the nAgCNTs. In FIG. 1A, the black spots shown on surfaces of multi-walled nano tubes (MWNTs) having a pipe shape with a diameter of 10 to 15 nm are Ag nanoparticles coated. FIG. 1B illustrates Ag plated MWNTs in which MWNTs having a diameter 10 to 15 nm are plated with Ag to 20 to 80 nm As the aspect ratio of the CNT increases, the function of the CNT as the electrical bridge is improved, and the CNT has excellent mechanical and lubricating properties. Thus, the mechanical properties and abrasion resistance of the electrical contact material can be effectively improved. The aspect ratio of the CNT is 1000 to 10000.

(4) Ag Nanowires

Figure 1C:
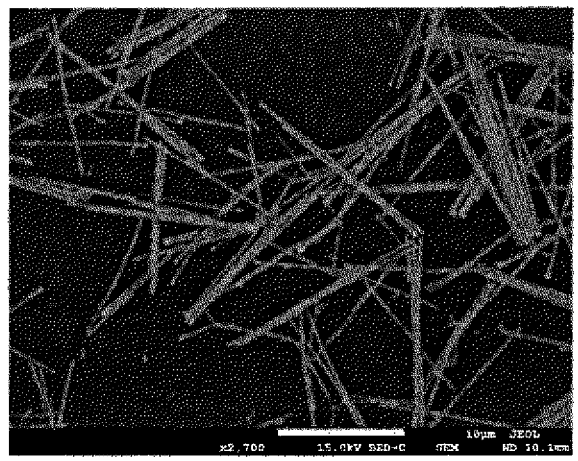
FIG. 1C is an SEM photograph of Ag nanowires.

The electrical contact material of the present disclosure may include Ag nanowires. Since the aspect ratio of the Ag nanowires is large, the percolation threshold of the Ag nanowires occurs at low concentration. Thus, an electrical network is formed even with low Ag content, thereby reducing the preparation cost of an Ag—CdO based or Ag—Ni based alloy that is a conventional electrical contact material. The Ag nanowires preferably have a diameter of 10 to 300 nm and a length of 10 to 70 µm. FIG. 1C illustrates a scanning electron microscope (SEM) photograph of the Ag nanowires.

(5) Preparation of Electrical Contact Material

Figure 2:
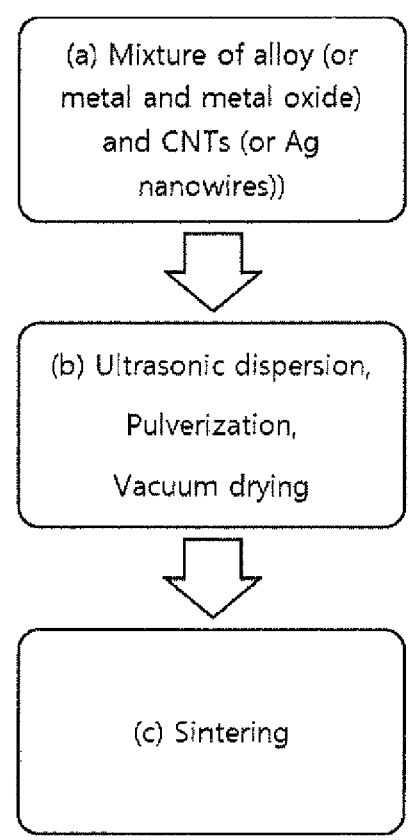
FIG. 2 is a flowchart illustrating a method for preparing an electrical contact material according to an exemplary embodiment.

A method for preparing an electrical contact material according to the present disclosure includes: (a) preparing a powder mixture by mixing (i) one or more kinds of metal selected from the group consisting of Ag, Cu and Au, and an alloy of Ni, and (ii) CNTs coated with Ag nanoparticles, CNTs plated with Ag or Ag nanowires, or preparing a powder mixture by mixing (i) one or more kinds of metal selected from the group consisting of Ag, Cu, Ni and Au, (ii) a metal oxide that is cadmium oxide, indium oxide, tin oxide, zinc oxide or mixture thereof, and (iii) CNTs coated with Ag nanoparticles, CNTs plated with Ag or Ag nanowires; (b) dispersing the powered mixture, using ultra sonication, and vacuum drying the dispersed powder mixture; and (c) sintering the vacuum-dried powder mixture. FIG. 2 illustrates the method for preparing the electrical contact material.

Hereinafter, the method for preparing the electrical contact material will be described in detail.

(5-1) Preparation of nAgCNTs

Composites (nAgCNTs) of Ag nanoparticles and CNTs are prepared. First, the Ag nanoparticles are formed by melting $AgNO_3$ in ethanol and then adding a small amount of benzyl-mercaptan into the ethanol. The Ag nanoparticles bonded to the benzyl group provided from the benzyl-mercaptan are bonded to the CNTs within a few hours when bath sonication is performed. Therefore, the nAgCNTs are formed.

(5-2) Preparation of Ag plated CNTs

Ag plated CNTs are prepared. First, CNTs immersed in an $HNO_3$ solution are subjected to ultrasonic dispersion and acid treatment for one minute and then dispersed using the bath sonication. The dispersed and acid-treated CNTs are washed with deionized water, using vacuum filtration. The acid-treated CNTs are sequentially immersed in a $SnCl_2$+HCl mixed solution and a $PdCl_2$+HCl mixed solution, and ultra sonication are applied to each of the $SnCl_2$+HCl mixed solution and the $PdCl_2$+HCl mixed solution for 30 minutes, thereby sequentially coupling $Sn^{2+}$ and $Pd^{2+}$ to surfaces of the CNTs. Subsequently, the CNTs are mixed with an $AgNO_3$ solution and an HCHO solution while adding an ammonia solution and adjusting their pH to pH 8.5, thereby obtaining Ag plated CNTs.

(5-3) Mixture of Nano Fillers (nAgCNTs, Ag Plated CNTs or Ag Nanowires), Metal and Metal Oxide A powder mixture is prepared by uniformly mixing nAgCNTs or Ag nanowires with metal and metal oxide. For example, mixture powder and metal balls may be mixed at a ratio of 1:4 in a metal jar for 1 to 10 hours, using high energy ball milling. Thus, the mixed powder and the metal balls are uniformly mixed. In this state, metal particles are further miniaturized as compared with those in the early stage, and an inert gas is filled in the metal jar in order to prevent oxidation. In uniform mixture using ultra sonication, the mixture powder is dispersed in a solvent such as ethanol, and the ultra sonication are applied to the mixture powder for 10 minutes, thereby uniformly mixing the mixture powder with the solvent. The mixed powder is separated from the solvent, using the vacuum filtration. The separated mixture powder is dried for 24 hours under a vacuum atmosphere of $1\times10^{-3}$ and then pulverized.

(5-4) Sintering—Preparation of High Density Composite Sample

The powder mixture is sintered while being maintained at a temperature of 750 to 830° C. for one minute.

Preferably, spark plasma sintering (SPS) may be used as the sintering. The SPS is a sintering technique in which pulse current is directly applied to raw material particles being compressed in a graphite mold, thereby using, as a main heat source, spark plasma generated in spaces between the particles. In this technique, high energy of the spark plasma can be effectively applied to heat diffusion, action of electric fields, and the like. Through the SPS, a sudden increase in temperature is possible at low temperature for a short period of time. Hence, the SPS can control the growth of particles and obtain a dense composite for a short period of time, and easily sinter a material to be sintered with difficulty. Thus, it is possible to uniformly and more quickly sinter raw material powder.

In the SPS, the graphite mold containing the powder mixture is sintered while being compressed in one axial direction in a spark plasma sintering equipment, thereby preparing a high-density composite sample. To this end, it is important to secure a single phase by sufficiently performing reaction sintering and ensure high density by performing degassing and homogenization treatment up to high temperature. The Ag—Ni based alloy is preferably sintered at 750 to 790° C. for one minute, using the SPS, and the Ag—CdO based alloy is preferably maintained at 830° C. for one minute, using the SPS. Both the alloys are sintered under a pressure of 80 Mpa. The composite sample may be prepared using hot rolling or hot pressing, rather than the sintering.

(6) Composite

Figure 3A:
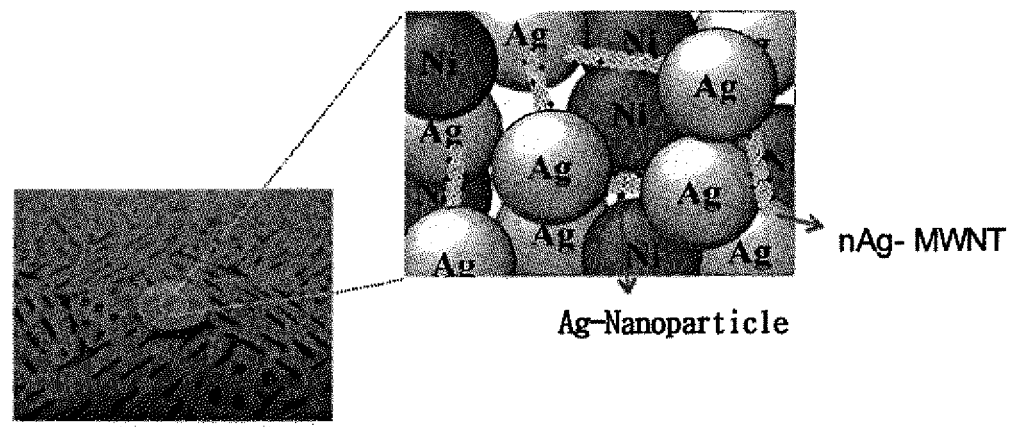
FIG. 3A is view schematically showing an electrical contact material including nAgCNTs according to an exemplary embodiment.
Figure 3B:
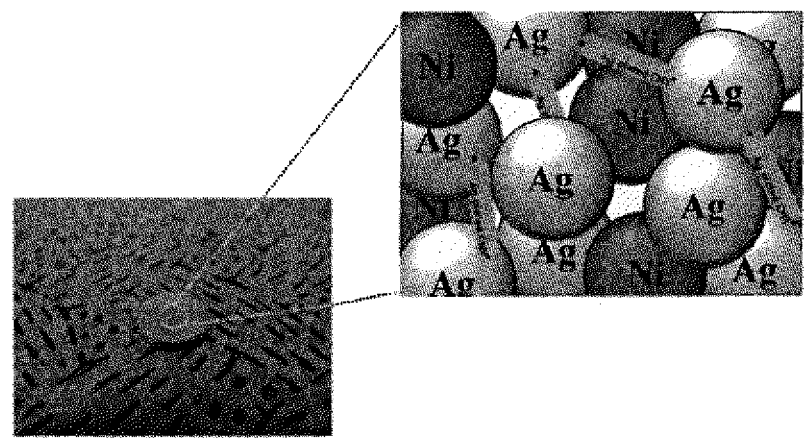
FIG. 3B is view schematically showing an electrical contact material including Ag plated CNTs according to an exemplary embodiment.
Figure 3C:
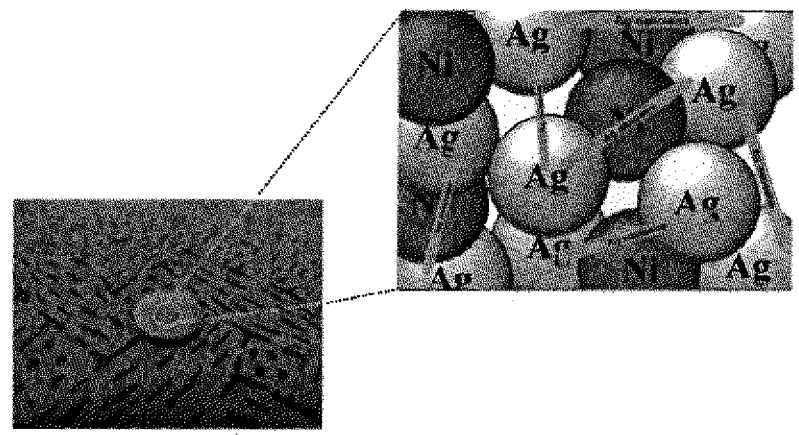
FIG. 3C is view schematically showing an electrical contact material including Ag nanowires according to an exemplary embodiment.

In an example of the present disclosure, as shown in FIGS. 3A to 3C, the prepared electrical contact material may include Ag and Ni particles with a micrometer size, nAgCNTs coated with CdO and Ag particles (FIG. 3A), Ag plated CNTs (FIG. 3B), and Ag nanowires (FIG. 3C).

Figure 3D:
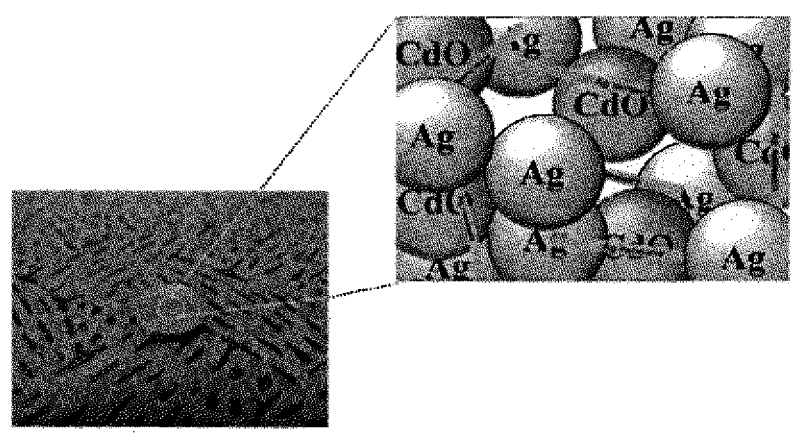
FIG. 3D is view schematically showing an electrical contact material including Ag—CdO—Ag nanowires according to an exemplary embodiment.

Multi-walled Carbon Nanotubes (MWNTs) are used as the CNTs in FIGS. 3A and 3B, and Ag nanowires are used as the CNTs in FIGS. 3C and 3D.

As shown in FIG. 3A, the nAgCNTs are CNT structures in which Ag nanoparticles are self-assembled by coating surfaces of the CNTs with Ag nanoparticles. The Ag nanoparticles may be easily coalescent with adjacent Ag particles (conductive metal particles) with a micro size at a remarkably low temperature, as compared with Ag nanoparticles in a bulk state. Hence, it is possible to remarkably reduce contact resistance, thereby maintaining electrical properties of the electrical contact material.

In FIG. 3B, the Ag plated CNTs are CNT structures in which the surfaces of the CNTs are plated with Ag. The Ag plated CNTs are sintered with Ag particles with a micro size, so that it is possible to reduce contact resistance, thereby improving the electrical properties of the electrical contact material. The Ag nanowires shown in FIGS. 3C and 3D are sintered with Ag with a micro size at low temperature, and reaches the percolation threshold even when a small amount of the Ag is added. Thus, although the content of the Ag is reduced in the electrical contact material, the contact performance of the electrical contact material can be maintained.

Figure 4A:
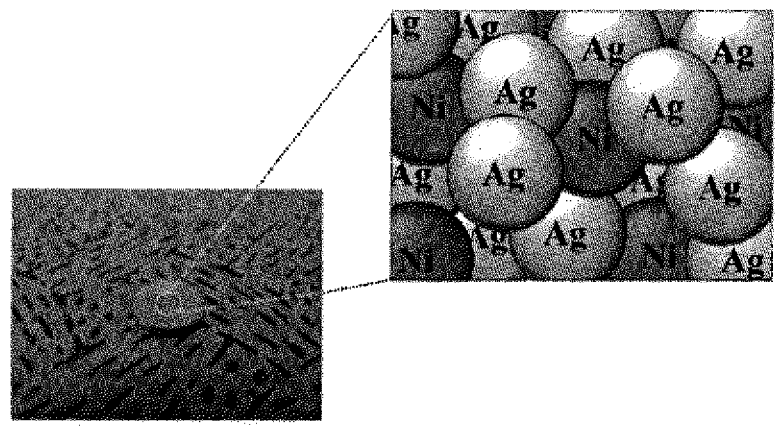
FIG. 4A is a view schematically showing a conventional Ag—Ni based electrical contact material.
Figure 4B:
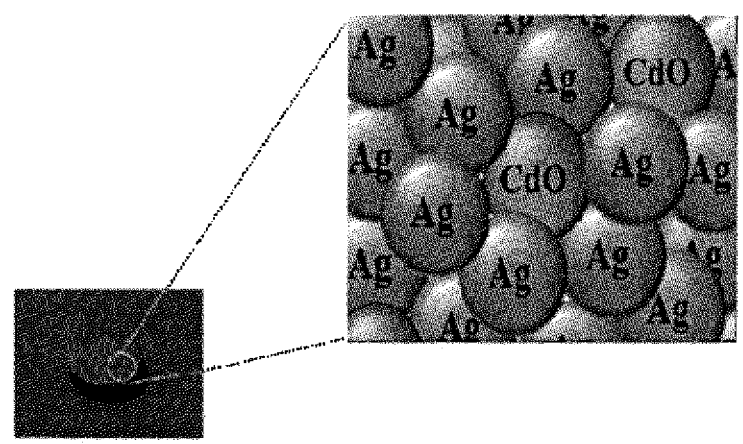
FIG. 4B is a view schematically showing a conventional Ag—CdO based electrical contact material.

FIGS. 4A and 4B respectively illustrate electrical contact materials made of an Ag—Ni alloy and an Ag—CdO alloy according to the conventional art.

Hereinafter, the present disclosure will be described in detail through exemplary embodiments. However, the following embodiments and experimental examples are merely illustrative, and the present invention is not limited to the following embodiments and experimental examples.

<Embodiment 1>

1-1. Preparation of nAgCNTs $AgNO_3$ was melted in ethanol for one hour by using a stirrer using a magnetic bar and then stirred for three days in a state in which a small amount of benzyl-mercaptan is added to the ethanol, thereby forming Ag nanoparticles. The Ag nanoparticles bonded to the benzyl group provided from the benzyl-mercaptan were bonded to the CNTs within a few hours when the bath sonication is performed.

1-2. Preparation of Ag—Ni-nAgCNTs

After nAgCNTs (0.1 wt %) composed with Ag powder (59.9 wt %) having a micro size and Ni powder (40 wt %) were immersed in ethanol, each of the nAgCNTs and the Ni powder was uniformly dispersed using the ultra sonication. After the dispersed solutions were combined, the combined solution was again dispersed using the ultra sonication. The dispersed mixture powder was separated from the solvent, using vacuum filtration, and then vacuum-dried. The dried powder was pulverized, thereby finally obtaining mixture powder.

The mixture powder was filled in a graphite mold and then maintained at 790° C. for one minute, using the SPS. A pressure of 80 Mpa was applied to the mixture powder, thereby preparing an Ag—Ni-nAgCNTs composite.

<Embodiment 2>

Ag plated CNTs (1 wt %) was used rather than Ag particles (59 wt %) with a micro size. A sintered body was prepared in the same manner as that of Embodiment 1, except that the sintering temperature was 750° C. The Ag plated CNTs had a diameter of 20 to 80 nm.

<Embodiment 3>

Ag nanoparticles (79 wt %) with a micro size was used, and CdO (20 wt %) that was a metal oxide was used rather than Ni. A sintered body was prepared by adding Ag nanowires (1 wt %). The sintered body was maintained at a sintering temperature of 830° C. for one minute, and a pressure of 80 Mpa was applied to the sintered body. The Ag nanowires had a diameter of about 70 nm and a length of about 70 μm.

COMPARATIVE EXAMPLE 1

An Ag—Ni composite sample was prepared in the same manner as that of Embodiment 1, except that Ag powder (60 wt %) with a micro size was used, and nAgCNTs were not used.

COMPARATIVE EXAMPLE 2

An Ag—CdO composite sample was prepared in the same manner as that of Embodiment 3, except that Ag particles (60 wt %) with a micro size were used, CdO (40 wt %) that was a metal oxide was used, and Ag nanowires were not used.

EXPERIMENTAL EXAMPLE 1

The hardnesses and electrical conductivities of the electrical contact materials prepared in Embodiments 1 to 4 and Comparative examples 1 and 2 were measured.

1) Hardness

Hardnesses of five points of the sample were measured using a Vickers hardness tester, thereby obtaining an average value of the measured hardnesses.

2) Electrical Conductivity

The electrical conductivity was measured using a 4 point probe in-line technique. The measured electrical conductivity was converted into IACS (%). When the converted value then exceeded 50%, the IACS was represented by 'excellence'. When the converted value was less than 50%, the IACS was represented by 'inferiority'.

TABLE 1

|  | Contact Material | Hardness (Hv) | IACS (%) |
| --- | --- | --- | --- |
| Embodiment 1 | Ag-Ni-nAgCNTs | 152 | Excellence |
| Embodiment 2 | Ag-Ni-Ag plated CNTs | 152.5 | Excellence |

TABLE 1-continued

|  | Contact Material | Hardness (Hv) | IACS (%) |
| --- | --- | --- | --- |
| Embodiment 3 | Ag-CdO-Ag nanowires | 85.2 | Excellence |
| Comparative Example 1 | Ag-Ni | 130.0 | Excellence |
| Comparative Example 2 | Ag-CdO | 83.3 | Inferiority |

As can be seen from Table 1, when comparing Embodiments 1 and 2 with Comparative example 1, the nAgCNTs (0.1 wt %) coated with the Ag nanoparticles (Embodiment 1) or Ag plated CNTs (1 wt %) is added rather than the Ag, so that the hardness of the electrical contact material is remarkably increased while maintaining excellent electrical conductivity, thereby improving properties of the electrical contact material.

When comparing Embodiment 3 with Comparative example 2, the Ag nanowires (1 wt %) are added rather than the Ag, so that both the electrical conductivity and hardness of the electrical contact material are increased.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electrical contact material, comprising:
(i) an alloy comprising a mixture of nickel (Ni) and one or more kinds of metals selected from the group consisting of silver (Ag), copper (Cu) and gold (Au); and
(ii) carbon nano tubes (CNTs) coated with Ag nanoparticles,
wherein a size of each of the Ag nanoparticles is 3 to 5 nm,
wherein, based on an entire weight of the alloy, wt % of the metal is 55 to 65 wt % and wt % of the Ni is 35 to 45 wt %,
wherein, based on an entire weight of the electrical contact material, wt % of the CNTs is 0.1 to 5 wt %.

2. The electrical contact material of claim 1, wherein the one or more kinds of metal is the Ag.

* * * * *